US011151008B2

(12) United States Patent
Mercer et al.

(10) Patent No.: US 11,151,008 B2
(45) Date of Patent: Oct. 19, 2021

(54) INTELLIGENT DIAGNOSTIC SYSTEM

(71) Applicant: Oceaneering International, Inc., Houston, TX (US)

(72) Inventors: Joshua Warren Mercer, Austin, TX (US); Jeff Newberry, Pflugerville, TX (US); Govind Shil Dayal Srivastava, Austin (CA)

(73) Assignee: Oceaneering International, Inc., Houston, TX (US)

( * ) Notice: Subject to any disclaimer, the term of this patent is extended or adjusted under 35 U.S.C. 154(b) by 352 days.

(21) Appl. No.: 16/274,369

(22) Filed: Feb. 13, 2019

(65) Prior Publication Data

US 2019/0188105 A1 Jun. 20, 2019

Related U.S. Application Data

(63) Continuation-in-part of application No. 14/323,386, filed on Jul. 3, 2014, now abandoned.

(60) Provisional application No. 61/843,229, filed on Jul. 5, 2013.

(51) Int. Cl.
*G06F 11/30* (2006.01)
*G06F 11/34* (2006.01)
*G06F 11/07* (2006.01)

(52) U.S. Cl.
CPC ...... *G06F 11/3055* (2013.01); *G06F 11/0709* (2013.01); *G06F 11/079* (2013.01); *G06F 11/3006* (2013.01); *G06F 11/3089* (2013.01); *G06F 11/3452* (2013.01); *G06F 11/3476* (2013.01)

(58) Field of Classification Search
None
See application file for complete search history.

(56) References Cited

U.S. PATENT DOCUMENTS

| 7,558,999 B2* | 7/2009 | Adkisson | G06F 11/2252 365/201 |
| 2003/0149919 A1* | 8/2003 | Greenwald | G06F 11/2257 714/43 |
| 2007/0157155 A1* | 7/2007 | Peters | G06F 8/10 717/100 |

(Continued)

OTHER PUBLICATIONS

Fenton, William G.; McGinnity, T.M.; Maguire, Liam P.; Fault Diagnosis of Electronic Systems Using Intelligent Techniques: A Review; Aug. 2001; IEEE Transactions on Systems, Man, and Cybernetics—Part C: Applications and Reviews, vol. 31, No. 3; p. 269-281 (Year: 2001).*

*Primary Examiner* — Mohammad K Islam
*Assistant Examiner* — Terence E Stifter, Jr.
(74) *Attorney, Agent, or Firm* — Maze IP Law, P.C.

(57) ABSTRACT

A diagnostic system may utilize telemetry from a monitored system to infer information about the operation of various components systems within the monitored system. In embodiments, inferences may be drawn from a comparison of various component systems using a system of implication and exoneration. Exoneration is utilized to isolate faulty components from functioning components by comparing information between the systems, which may run in parallel. A dynamic grouping algorithm may eventually isolate faulty components and suggest the root cause as well as multiple distinct faults.

23 Claims, 8 Drawing Sheets

(56) References Cited

U.S. PATENT DOCUMENTS

2009/0112786 A1* 4/2009 Abels .................. G06N 5/025
 706/47
2011/0173496 A1* 7/2011 Hosek ................ G05B 23/0235
 714/26
2014/0103848 A1* 4/2014 Hersh ................ G05B 23/0278
 318/490

* cited by examiner

INTELLIGENT DIAGNOSTIC SYSTEM

CROSS-REFERENCE TO RELATED APPLICATION

This application is a continuation-in-part of U.S. patent application Ser. No. 14/323,386 entitled "Intelligent Diagnostic System" filed Jul. 3, 2014 and claims the benefit of priority under 35 U.S.C. § 119(e) from U.S. Provisional Patent Application No. 61/843,229 entitled "Intelligent Diagnostic System" filed Jul. 5, 2013.

FIELD OF THE INVENTION

The invention relates to diagnostics, detection, location, and prediction of faults within a bio-electrical-mechanical system that provides a method of telemetry and has expected behavior.

BACKGROUND

In the many markets systems requiring diagnostics use techniques that are not model based to aid in diagnostics, detection, location, and prediction of faults within a bio-electrical-mechanical system that provides a method of telemetry and has expected behavior. However, a diagnostic system which is model based and used to aid in diagnostics, detection, location, and prediction of faults within a bio-electrical-mechanical system can be beneficial.

As more fully described below, various system embodiments and methods incorporate the described invention for diagnostics, detection, location, and prediction of faults within a system to be monitored and/or diagnosed. One component of such apparatuses is intelligent diagnostic system software, which may be modular, and which is more fully described herein below. Using the intelligent diagnostic system software, a monitored system does not have to have a control function, or indeed any human interface, as long as there is an expected behavior and an ability to retrieve values that correspond to the state of the system. Moreover, embodiments of invention can work with a data network or without a data network, e.g. in embodiments the diagnostic system comprises a non-connected mode that allows a user to mark symptoms as presenting. In general, although it is preferable to use a data network, it is not a necessity as the invention is not predicated on a telemetry connection. Therefore, although a remote connection is a convenient feature and likely the way the invention is deployed wherever such connections are available, diagnostic systems that have little or no connectivity can still use the invention provided the described embodiments have access to whatever measured state variables are available.

Typically, the diagnostic system creates visible reports shown on one or more results screen displays which show causes that are exonerated but which are still related to the presenting symptoms. These results screen displays can show both causes exonerated by the diagnostic system as well as causes exonerated by the user (with possibility to undo mistakes).

FIGURES

The following figures are illustrative.

DESCRIPTION OF PREFERRED EMBODIMENTS

As used herein, the following terms have the following meanings. A "computer" or "computing platform" is meant to comprise all manner of computers, including but not limited to desktop computers, laptop computers, tablet computers, smart phones, and the like, or combinations thereof. A "component" is an object or piece of desired diagnostic resolution in the system that is being monitored of which will be diagnosed, e.g. typically a field replaceable unit. A "cause" is a failure of some functionality, possibly in some further specified way, that is represented in one physical location. In particular, a cause exists in a component and may be a reason for a symptom to be occurring. A "graphical representation object" or "GRO" is a graphic representation of a section of the system, such as a remotely operated vehicle (ROV), a blowout preventer (BOP), tooling, or telemetric can, or the like, or a combination thereof. "JSON" means Java Script Object Notation. A "symptom" is a detected indication of a problem in the system. "Monitored system" is the whole entity that is either to be monitored and/or which will be subject to diagnosis and which may include one or more bio-electrical-mechanical systems that provide a method of telemetry and have expected behavior, e.g. remote operated vehicles (ROV), blowout preventers (BOP), and other subsea hardware and equipment. "Diagnostic system" is an apparatus comprising the described and claimed invention.

Figure 1:
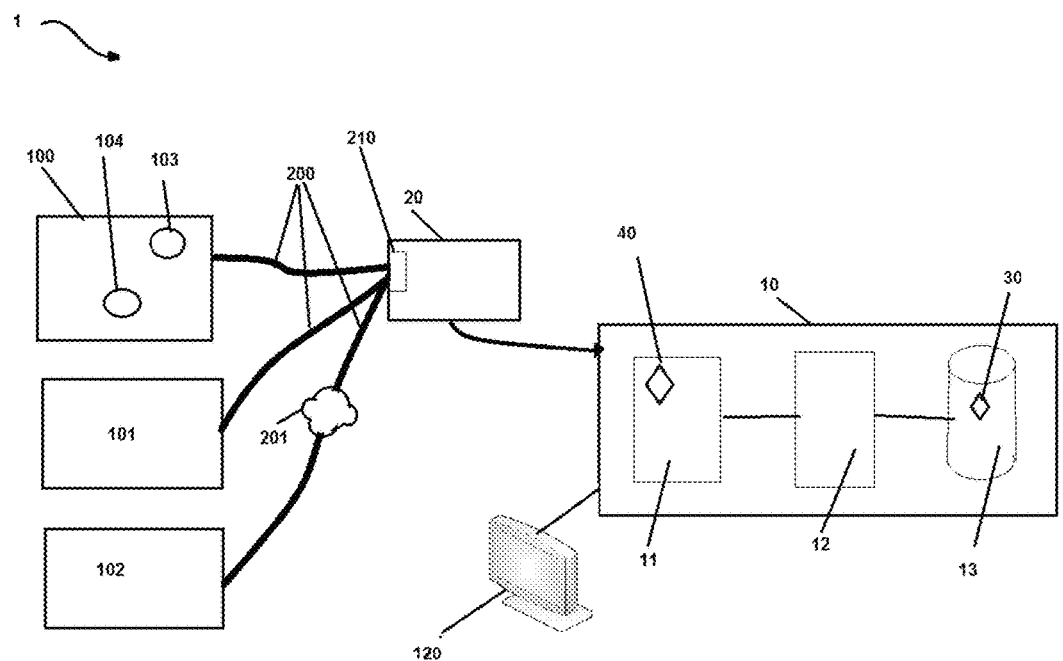
FIG. 1 is a block diagram of generally standard components.
Figure 2:
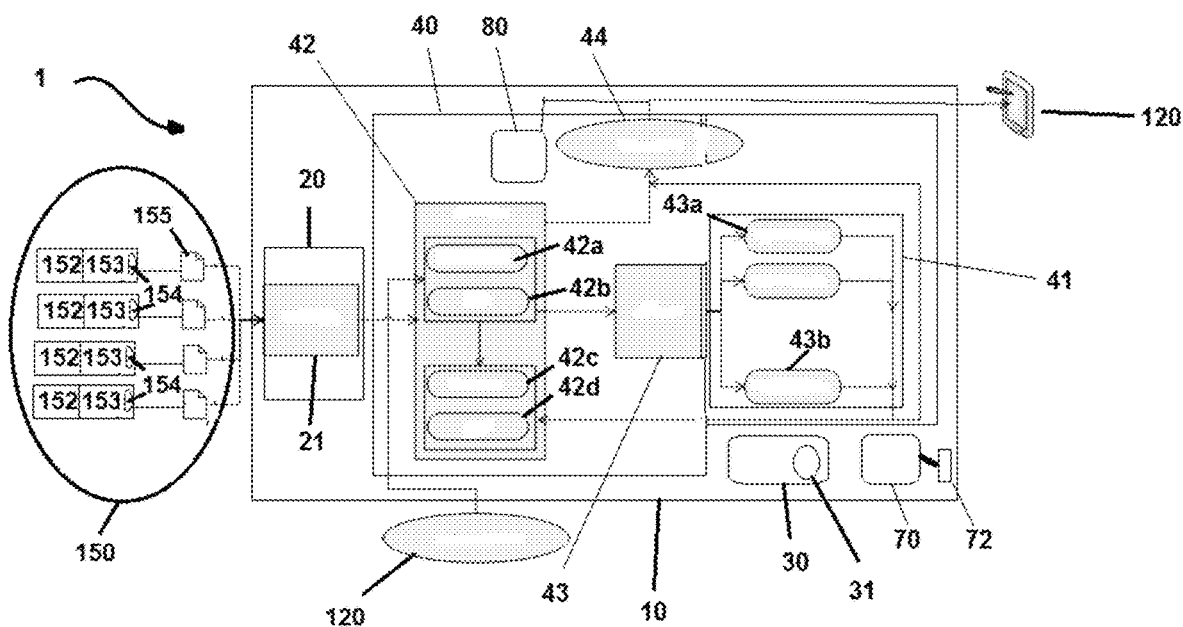
FIG. 2 is a block diagram illustrating various processing components of an illustrative diagnostic system.

Referring generally to FIGS. 1 and 2, in an embodiment diagnostic system 1, useful for diagnosing a fault in one or more monitored systems 100, comprises computer 10; data receiver 20 operatively in communication with computer 10, where data receiver 20 is configured to receive data concerning the one or more monitored systems 100 being monitored; a set of behavior-based diagnostic rules 30 resident in data store 13 where the set of behavior-based diagnostic rules 30 comprise a set of condition cause data 31; intelligent diagnostic software 40 resident in and configured to execute in computer 10; and data output device 120 operatively in communication with graphics interface handler 44. Diagnostic system 1 is typically configured to be deployed as an on-site diagnostics tool for a single monitored system 100; an on-site diagnostics tool for a plurality of monitored systems 100; part of a remote diagnostics tool for a single monitored system 100; part of a remote diagnostics tool for a plurality of monitored systems 100; part of a monitoring system that monitors health and operation of a set of monitored systems 100 from a single location; or the like; or a combination thereof.

In certain embodiments, monitored system 100 comprises one or more monitored components 103,104 (FIG. 1), which are monitored devices contained at least partially within or otherwise integrated into monitored system 100, and/or one or more monitored components 101 which may comprise a monitored device that is external to monitored system 100. An external monitored device 101 such as external monitored device 150 typically comprises one or more circuits 152 to be monitored, one or more circuit controllers 153 operatively in communication with one or more circuits 152 to be monitored, one or more sensors 154 operatively in communication with one or more circuits 152 to be monitored where sensors 154 are configured to provide condition state data representative of a predetermined set of condition states of one or more circuits 152 to be monitored and one or more first data communication interfaces 155 operatively in communication with one or more circuit controllers 153 and one or more sensors 154. Each data communication interfaces 155 may be in communication with a plurality of circuit controllers 153 and sensors 154, and each circuit controller 153 may be in communication with a plurality of sensors 154.

Monitored system 100 may comprise a bio-electrical-mechanical system such as, but not limited to, one or more monitored components 103,104 (FIG. 1) as well as external monitored components such as remotely operated vehicles 101, blowout preventer 102, or the like, or a combination thereof. However, monitored system 100 may also work with any system, whether it is a human body, a valve system, a car, a tree, or the like, or combinations thereof, provided there are appropriate data to be collected.

Computer 10 typically comprises processor 11, memory 12, and data store 13.

Data receiver 20, which is operatively in communication with the computer, may further comprise a serial data receiver operatively in communication with monitored system 100 such as via first data communication interface 155, a manually input data receiver, or the like, or a combination thereof. The received data typically comprise a condition state data set comprising data which are representative of a condition state received about monitored system 100. In embodiments, data receiver 20 may further comprise data loader 21 operatively in communication with data store 13 in which case the set of information handlers 42 is operatively in communication with data loader 21 and graphics interface handler 44 is operatively in communication with the set of information handlers 42 and algorithm manager 43. Data loader 21 is typically a data file processor that comprises functionality such as being able to open and read a data file, e.g. a stream reader.

The set of condition cause data 31 typically contain data describing a set of possible causes which are relatable to a condition state that may present in the received data. By way of example and not limitation, this may be represented as follows:

---

Symptom Name
decision path handler: test, NOT(cause)
Possible Causes
{
    "Condition_1", weightA, component_link, component data
    descriptor
    "Condition_2", weightB, component_link, component data
    descriptor
}
Causes To Exonerate
{
    "Condition_3",exonerated_component, component data descriptor
    "Condition_4",exonerated_component, component data descriptors
}

---

Thus, the data set may resemble the following:

---

Name: Symptom X
Expression: AND(LT(monitored_condition_1, value ),
NOT (monitored_condition_2))
SuspectList
{
    "Condition_1", A
    "Condition_2", B
}
ExonerationList
{
    "Condition_3"
    "Condition_4"
}

---

By way of example and not limitation, the example above can be interpreted as code which determines that "System X" will be on when the "monitored_condition_1" is less than "value" and "monitored_condition_2" is off. When Symptom X is on, the "Condition_1" cause which has an A % probability (e.g., 70%) and the "Condition_2" cause which has a B % probability (e.g. 30%) will be implicated. When Symptom X is not on, the "Condition_3" and "Condition_4" causes will be exonerated.

Because the set of behavior-based diagnostic rules 30 typically defines a set of possible cause implication and exoneration data, the set of behavior-based diagnostic rules 30 typically comprises a set of implication cause data 301 which comprise data about one or more components, e.g. a first component 103, of monitored system 100 that may be related to a cause of the condition state in the received data and a set of exonerated cause data 302 which typically comprise data about one or more components, e.g. a second component 104, of monitored system 100 that may be exonerated when the condition state is not present in the received data. The set of behavior-based diagnostic rules 30 also generally comprises a set of component data descriptors 303 which may be programmatically and/or dynamically updatable which may be tailored to a general and/or a specific monitored system 100.

As indicated above, the set of behavior-based diagnostic rules 30 further generally comprises a set of symptom-causality chain data descriptors 304 where each member of the set of symptom-causality chain data descriptors 304 comprises symptom name 304a of a symptom; a set of possible causes 304b of the symptom if the condition state in the received data comprises the symptom and an associated set of probabilistic weights 304c associated with the set of possible causes if the condition state in the received data comprises the symptom; and a list of causes to exonerate 305 if the condition state in the received data does not comprise the symptom. The set of possible causes 304b of the symptom and the associated set of probabilistic weights 304c (e.g. as reflected at 401a in FIG. 5) may also comprise a pointer to a unique component 103,104 with which a specific cause of the symptom is associated; a set of possible symptoms to which the specific cause belongs; and a set of occurring symptoms (e.g. as reflected at 401c in FIG. 5) to which the specific cause belongs.

The set of symptom-causality chain data descriptors 304 typically further comprises a set of client symptoms which comprise a set of decision path handlers which, when evaluated to true, indicate the symptom is occurring, and, when evaluated to false, indicate that the symptom is not occurring. A type of path handler may comprise a set of logic branches and nodes, as will be familiar to those of ordinary skill in programming arts. The set of symptom-causality chain data descriptors typically further comprises staleness indicator to indicate whether or not the data used by the client symptom is stale.

As will be familiar to those of ordinary skill in software programming arts, a staleness indicator may resemble condition cause data 31 as discussed above, e.g. comprise a set of logic which allows conditional branching. Accordingly, each member of the set of symptom-causality chain data descriptors typically also further comprises a first set of logic, configured to determine if the symptom is occurring, and a second set of logic, configured to determine whether or not the received data are stale, which are to be used with non-manually received data.

The set of component data descriptors further typically comprise component data representing a physical component in monitored system 100, e.g. component 103 or 104. These component data may comprise a set of links to causes representing possible physical failures within the physical component; a severity value representative of a likelihood of failure, which may be set externally; and an alert value used to represent that at least one set of links to causes representing possible physical failures within the physical component is suspect. By way of example and not limitation, these may be represented as follows:

```
{
    "ComponentList" : [
        {
            "Component" : {
                "name" : "name1",
                "criticality" : "low",
                "Causes" : [
                    "Veh, OPAC, A7, hardware1, reason1",
                    "Veh, OPAC, A7, hardware2, reason2",
                ]
            }
        },
        {
            "Component" : {
                "name" : "name2",
                "criticality" : "very high",
                "Causes" : [
                    "Veh, OPAC, A7, hardware3, reason3",
                    "Veh, OPAC, A7, hardware4, reason4",
                ]
            }
        }
    ]
}
```

One of ordinary skill in software programming arts will recognize the general nature of this structure.

The set of behavior-based diagnostic rules 30 further generally comprises a set of graphic representation objects which further comprise a name of an instance, an associated graphic, and a set of children graphic representation objects and components. By way of example and not limitation, a graphics representation object may resemble the following:

```
{
    "GraphicsList" : [
        {
            "Graphic" : {
                "name" : "figure1",
                "DisplayGroup" : "root",
                "AllClearImage" : "image1.png",
                "NotAllClearImage" : "image2.png",
                "xRelPos" : 0.342,
                "yRelPos" : 0.2333,
                "RelWidth" : 0.315893,
                "RelHeight" : 0.15625
```

-continued

Figure 3:
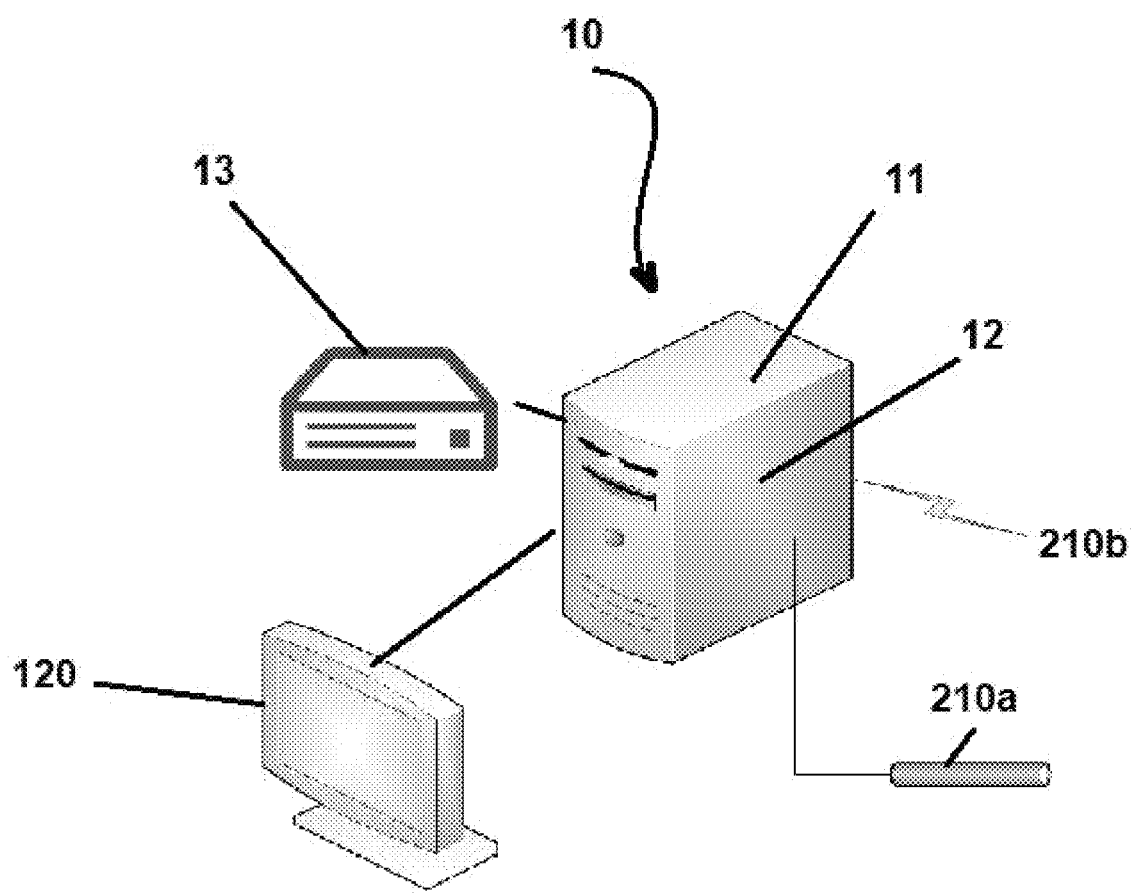
FIG. 3 is a block diagram of generally standard computer hardware components.
Figure 4:
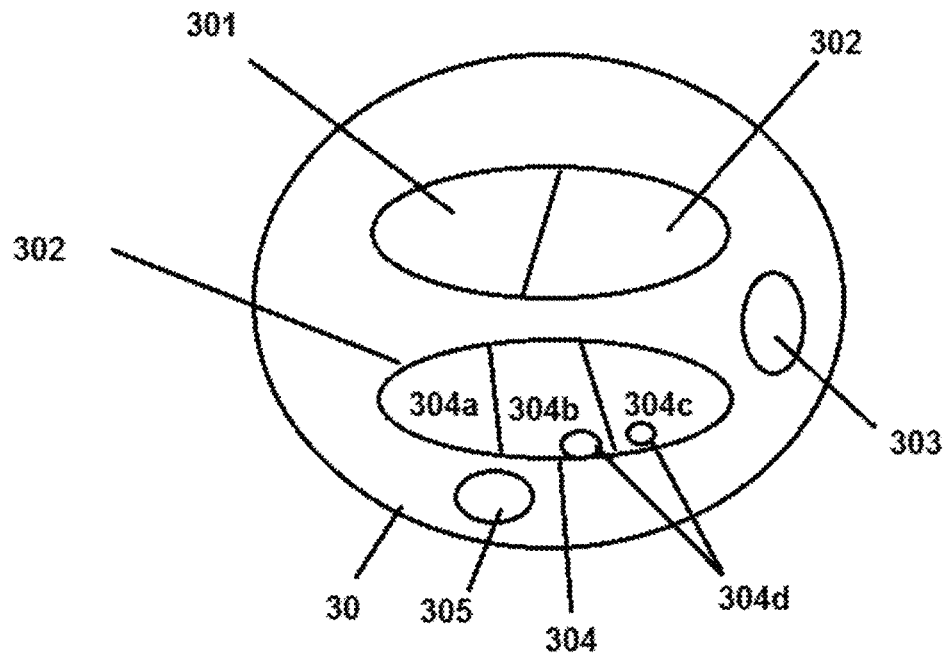
FIG. 4 is a Venn diagram illustrating a set of behavior-based diagnostic rules which may be resident in a data store.

```
            }
        },
        {
            "Graphic" : {
                "name" : "figure2",
                "DisplayGroup" : "root",
                "AllClearImage" : "image3.png",
                "NotAllClearImage" : "image4.png",
                "xRelPos" : 0.342,
                "yRelPos" : 0.2333,
                "RelWidth" : 0.315893,
                "RelHeight" : 0.15625
                "ChildDisplayGroup" : "figure3",
                "SubGraphics" : [
                    "sub1",
                    "sub2"
                ]
            }
        },
        {
            "Graphic" : {
                "name" : "figure3",
                "DisplayGroup" : "group1",
                "AllClearImage" : "image4.png",
                "NotAllClearImage" : "image5.png",
                "xRelPos" : 0.5921,
                "yRelPos" : 0.5664,
                "RelWidth" : 0.315893,
                "RelHeight" : 0.15625,
                "ParentDisplayGroup" : "group2",
                "ChildDisplayGroup" : "group3"
            }
        }
    ]
}
```

In certain contemplated embodiments the set of behavior-based diagnostic rules 30 are encrypted. In these embodiments, data loader 21 may be present and configured to read in the encrypted set of behavior-based diagnostic rules 30, decrypt the encrypted set of behavior-based diagnostic rules 30, parse the decrypted set of behavior-based diagnostic rules into a parsed decrypted set of rules and/or information classes, and provide the parsed set and/or classes to one or more members of the set of information handlers 42.

Intelligent diagnostic software 40 typically comprises dynamic grouping algorithm 41; a set of information handlers 42; algorithm manager 43 which comprises a set of operative algorithms 430, and graphics interface handler 44. It further typically comprises command manager 45 which is operative to create and/or issue one or more control commands to one or more circuit controllers 155 such as data receiver 20.

Dynamic algorithm 41 may take many forms, as those of ordinary skill the programming arts will appreciate. By way of example and not limitation, one dynamic grouping algorithm 41 may be presented with or otherwise be configured to evaluate a symptom in view of a set of existing groups of "Grouped Symptoms." Dynamic algorithm 41 may check the symptom to be evaluated against a first unchecked group in the set of existing groups of Grouped Symptoms such as by comparing the "distance" between the symptom to be evaluated with each symptom in the first unchecked group in the set of existing groups of Grouped Symptoms, pair-wise, such as by using a "pseudo-measure." If the "distance" is sufficiently small for each symptom in the first unchecked group in the set of existing groups of Grouped Symptoms, dynamic grouping algorithm 41 will add the symptom to be evaluated into the first unchecked group in the set of existing groups of Grouped Symptoms and terminate. If not, the symptom to be evaluated does not belong in the first unchecked group in the set of existing groups of Grouped Symptoms and that group is from the list of unchecked groups. This process can then be repeated for each remaining unchecked group in the set of existing groups of Grouped Symptoms. If, after checking every group in the set of existing groups of Grouped Symptoms, the system to be evaluated does not belong in any group, dynamic grouping algorithm 41 may add that system to be evaluated as a new group. As used above, the "pseudo-measure" compares the "overlap" of implicated causes in one symptom with the implicated causes in the other symptom being compared and/or otherwise evaluated.

The set of information handlers 42 typically comprise fault symptom information handler 42*a*; fault causes information handler 42*b*; components information handler 42*c*; and graphics representation information handler 42*d*. Information handler 42 may be setup and implemented as a class in a language such as C #, C++, Java, JSON, or the like, or a combination thereof.

Additionally, algorithm manager 43 is typically operatively in communication with the set of information handlers 42 and configured to prepare one or more members 42*a* of the set of information handlers 42 as well as provide data to the set of operative algorithms 43*a*,43*b* and execute a member of the set of algorithms, e.g. a member of the set of live algorithms 43*a* and/or a member of the set of a user-initiated algorithm 43*b*, at a predetermined time. Algorithm manager 43 may comprise a managing object, as that term will be familiar to those of ordinary skill in the object oriented software programming arts. By way of example and not limitation, algorithms such as dynamic grouping algorithm 41 may be hard coded and passed on to algorithm manager 43 which executes those algorithms in a predetermined, correct order.

Intelligent diagnostic software 40 is typically configured to cause a fault analysis to occur at one or more predetermined times, e.g. programmed times, but may also be configured to cause a fault analysis to occur in response to an external event trigger. As used herein, a "live algorithm" is one which is engaged when a system to be diagnosed is operatively connected to system 1 and a "user-initiated algorithm" is one which is triggered by an end user.

Figure 5:
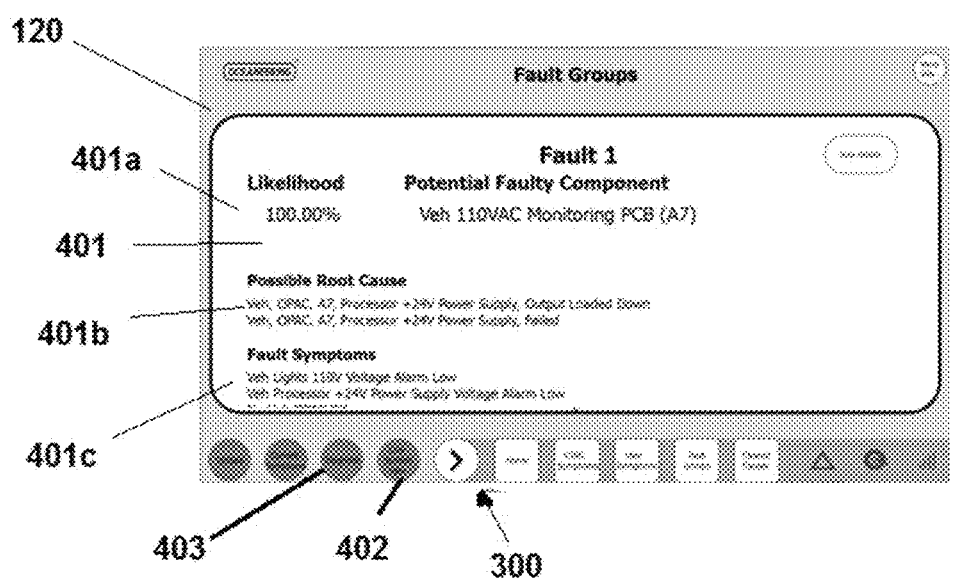
FIGS. 5-12 are graphic representations of illustrative screen displays.

By way of example, referring to FIG. 5, menu button 402 allows selection of a "Live View" which is constantly triggering based off of a symptom changing states according to the connected system. In certain embodiments, the grouping algorithm is also run, i.e. executed, in the live view, just on a clock triggered event, and runs off live (connected) data as opposed to data that are updated by user-request (locked or latched data). User-initiated algorithms 43*b* may also run, i.e. executed, on locked/latched data, e.g. data captured from monitored system 100 into a data store.

By way of further example, referring to FIG. 5, a user may initiate a user-initiated algorithm by selecting button 403 to trigger one or more diagnostic algorithms to run, i.e. execute.

Operative algorithms 43*a*,43*b* typically comprising a set of live algorithms 43*a* and a set of user-initiated algorithms 43*b*. Algorithm manager 43 is further typically configured to use and manage the set of live algorithms 43*a* and the set of user-initiated algorithms 43*b*; prepare fault symptom information handler 42*a* whenever it is time to diagnose monitored system 100; and run a selected subset of appropriate diagnostic algorithms. At least one member of the set of information handlers 42 typically comprises a set of supporting handlers which are configured to process a predetermined subset of rules from the set of information handlers 42.

In certain embodiments diagnostic system 1 further comprises network data interface 210 operatively in communication with data receiver 20 where network data interface 210 may comprise a wired interface 210*a*, a wireless interface 210*b*, or the like, or a combination thereof. As will be familiar to those of ordinary skill in data communications, network interface 210 may be configured to use a TCP/IP network data protocol including but not limited to communications via the Internet 201, a direct Ethernet connection such as connection 60, a satellite modem (not shown in the figures but similar to Internet 201), or the like, or a combination thereof.

In some embodiments, diagnostic system 1 further comprises logger 70 which is configured to accept messages to be logged from intelligent diagnostic software 40, process these messages into a set of log files 72, manage the set of log files 72, and interface with intelligent diagnostic software 40.

Additionally, in certain embodiments intelligent diagnostic system software 40 further comprises a system health status analyzer 80 which is configured to analyze system implicated components 103,104 of monitored system 100 based on a set of predetermined values that represent a risk measure and provide an indication of the analyzed system health status on data output device 120.

In the operation of certain embodiments, system information loaded into diagnostic system 1 typically contains a symptom-causes pattern, where the symptom is presenting when certain system state data is satisfied. Each symptom has associated causes that are implicated when the symptom is presenting and causes are exonerated when the symptom is not presenting. The dynamic grouping algorithm groups symptoms that share a common cause in groups where each distinct group represents a distinct fault. When a system state of monitored system 100 changes using data that the diagnostic system monitors, or when a technician changes the data, the dynamic grouping algorithm is activated. First, participating symptoms that are not presenting provide a list of causes that are exonerated. Then, the presenting symptoms and the associated, non-exonerated causes are entered into the grouping algorithm. This algorithm uses a custom pseudo-measure to compare symptoms pairwise and establish the relative size of shared causes. If the size of shared causes crosses a certain threshold, the symptoms are folded into a group; otherwise, they are separated into different groups. In this fashion, the number of groups is dynamically created by the dynamic grouping algorithm 41 to yield the number of distinct faults in the system.

This inference, comparison, and grouping technique stands in contrast to direct measurement model-based techniques in that diagnostic system 1 utilizes information on how the monitored system is expected to operate rather than how it is actually operating. The use of inference within the dynamic grouping algorithm 41 compensates for the possibility of either a bad rule in the rule set or bad data a faulty sensor) from the system being monitored.

Figure 12:
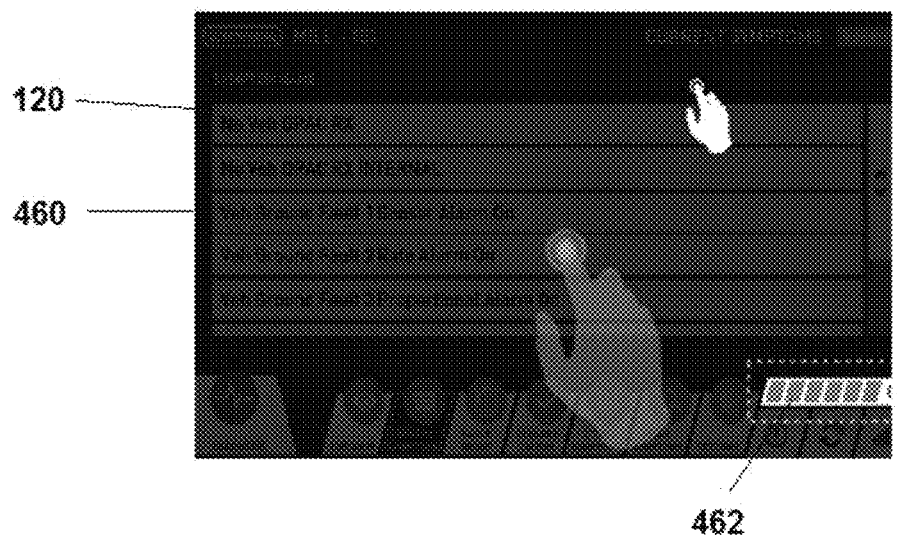
Figure 13:
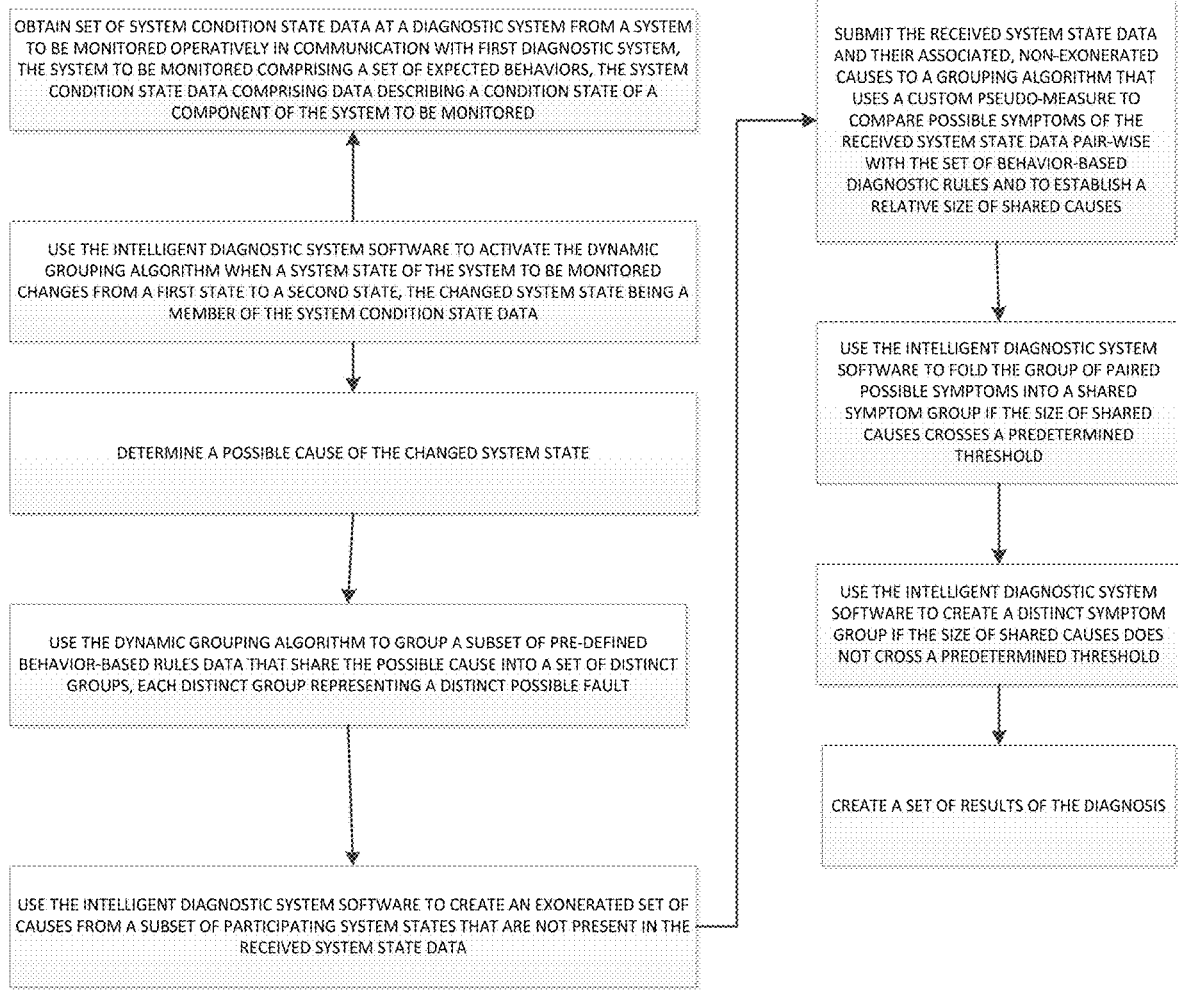
FIG. 13 is a flowchart of an illustrative process embodiment.

Referring now to FIG. 13 and generally to FIGS. 5-12, a fault in monitored system 100 (FIG. 1) may be monitored and/or diagnosed by obtaining a set of system condition state data at a diagnostic system, e.g. diagnostic system 1 (FIG. 1) or a larger system comprising diagnostic system 1, from monitored system 100 which is operatively in communication with diagnostic system 1, which is as described herein.

Monitored system 100 (FIG. 1) comprises a set of expected behaviors and may also be configured to provide data via telemetry, e.g. via one or more connections 200 (FIG. 1). The system condition state data typically comprises data describing a condition state of one or more components 103,104 (FIG. 1) of monitored system 100 where changes to condition state data may be detected using data obtained automatically from monitored system 100, manually, or the like, or a combination thereof.

Intelligent diagnostic system software 40 (FIG. 1) is typically executing in computer 10 (FIG. 1) and used to activate one or more dynamic grouping algorithms 41 (FIG. 2) when a system state of monitored system 100 (FIG. 1) changes from a first state to a second state, the changed system state being a member of the system condition state data. Each dynamic grouping algorithm 41 may comprise a set of metrics which may be improved programmatically using operational statistics information gathered from across a set of monitored systems 100.

Intelligent diagnostic system software 40 (FIG. 1) then determines a possible cause of the changed system state and uses one or more dynamic grouping algorithms 41 to group a subset of data, selected by dynamic grouping algorithms 41, from a pre-defined set of behavior-based diagnostic rules 30 (FIG. 1) that share the possible cause into a set of distinct groups where each distinct group represents a distinct possible fault. This can involve, by way of example and not limitation, using dynamic grouping algorithm 41. Each group of symptoms may be considered a distinct problem, where that group comprises a common set of causes with weights normalized across the group.

Intelligent diagnostic system software 40 (FIG. 1) then creates an exonerated set of causes from a subset of participating system states that are not present in the received system state data, leaving a set of non-exonerated causes associated with received system state date. These received system state data and their associated, non-exonerated causes are submitted to a grouping algorithm such as dynamic grouping algorithm 41 (FIG. 1) that uses a custom pseudo-measure to create a group of paired possible symptoms by comparing possible symptoms of the received system state data pair-wise with the set of behavior-based diagnostic rules 30 (FIG. 1) and establishing a relative size of shared causes.

Intelligent diagnostic system software 40 (FIG. 1) then folds the group of paired possible symptoms into a shared symptom group, typically only if the size of shared causes crosses a predetermined threshold. In this regard, folding comprises using dynamic algorithm 41 (FIG. 1) to process a given system against a set of symptom groups as described herein. Intelligent diagnostic system software 40 (FIG. 1) may then create a distinct symptom group if the size of shared causes does not cross a predetermined threshold.

At various points, such as when the implicated and exonerated sets are created, intelligent diagnostic system software 40 may create one or more sets of results of the diagnoses such as those which may be suitable for output to data output device 120 (FIG. 1).

In a further method, system fault diagnosis may comprise providing a set of encrypted data rules to diagnostic system 1, which is as described herein, where the set of encrypted data rules describe or otherwise model monitored system 100 (FIG. 1) which is to be diagnosed. Intelligent diagnostic system software 40 (FIG. 1) may comprise modular, extensible diagnostic software. These data rules are as described herein above.

System state data related to monitored system 100 (FIG. 1) may then be acquired by computer 10 (FIG. 1), either via one or more telemetry data communication links 200 (FIG. 1) from monitored system 100, manually, or the like, or a combination thereof. These system state data typically include particularly data related to electrical connectivity and current draw. By way of example and not limitation, communications link 200 may be established between data communications interface, e.g. 210, operatively in communication with computer 10 and monitored system 100 and data obtained via data communications link 200.

The set of encrypted data rules are provided or otherwise fed into data loader 20 (FIG. 1) which may be part of modular, extensible diagnostic software 40 (FIG. 1) operatively resident in computer 10 (FIG. 1), where diagnostic software 40 comprises a set of information handlers 42 (FIG. 1) that are operatively in communication with data loader 20.

Data loader 20 (FIG. 1) decrypts the set of encrypted data rules into an unencrypted set of data rules, parses the unencrypted set of data rules into information classes which are provided to the set of information handlers 42 (FIG. 1).

Algorithm manager 43 (FIG. 1), either a programmatically determined times or via an externally triggered event such as an event raised by monitored system 100 (FIG. 1) or manually, prepares the sorted data when it is time to diagnose monitored system 100 and creates one or more inferences representing a set of causes of a system state change reflected in the received data as to the operation of one or more possibly implicated components 103 (FIG. 1) within monitored system 100. This typically involves associating a set of implicated causes that are implicated when a symptom is present in the obtained system state data, the set of implicated causes selected from the sorted data; associating a set of exonerated causes that are exonerated when the symptom is not present in the obtained system state data, the set of exonerated causes selected from the sorted data; and activating one or more dynamic grouping algorithms 41 (FIG. 1) when the obtained system state data reflects a system state change, these dynamic grouping algorithms 41 configured to dynamically group a set of symptoms that share a common cause, where each distinct group represents a distinct fault, the dynamic grouping comprising using the dynamic grouping algorithm 41 to isolate a set of possible faulty components. One or more of the dynamic grouping algorithms 41 may be configured to detect, isolate, and locate multiple distinct fault causes.

A root cause is then proposed by entering a set of symptoms present in the obtained system state data and a set of associated, non-exonerated causes into the dynamic grouping algorithm 41 (FIG. 1); using a custom pseudo-measure to compare the entered set of symptoms pairwise and establish the relative size of shared causes; and dynamically creating a second set of groups by the dynamic grouping algorithm 41 to yield the number of distinct faults in the system. This dynamic creation typically comprises folding symptoms into a first shared causes group if a shared causes size crosses a predetermined threshold and separating symptoms into a second shared causes group if the shared causes size does not cross the predetermined threshold. Comparisons may operate in parallel. Once created, one or more sets of results of the diagnoses may be output, e.g. displayed in a graphic or textual format via graphics interface such as illustrated in FIGS. 6-14.

Output of the selected set of appropriate algorithms may be used to change a predetermined portion of the set of information handlers 42 (FIG. 1). In the particular case of an ROV, the metrics for the dynamic grouping algorithm 41 (FIG. 1) may be improved using operational statistics information gathered from across an ROV fleet.

In certain embodiments, diagnostic system 1 (FIG. 1) can be operated in one or both of two modes: a live mode and a locked mode. The live mode, which is one in which there is an actively connected monitored system 100 (FIG. 1), is substantially always updating, substantially continuously syncing information received from monitored system 1, running diagnostic software 40, and displaying the information graphically. Graphics displays generated by diagnostic system 1 may comprise a drill-down type of graphics, e.g. by blocks, but could be done by 3D models, where these graphics provide visual clues (such as flashing speed and color intensity) to suggest which components might hold the fault. In an embodiment, drill-down works substantially as follows. A graphic such as a picture or box (e.g., 402 in FIG. 6) representing monitored system 100 begins to flash or change colors or both. By clicking or touching an area of output device 120 containing the graphic, output device 120 changes its display to show a drill down subsequent display which shows a more specific subset of monitored system 100, e.g. at FIG. 7. In this subsequent display, a subcomponent may be flashing, e.g. 410*b*, and the user can continue drilling down until a terminal subcomponent display is reached.

Figure 8:
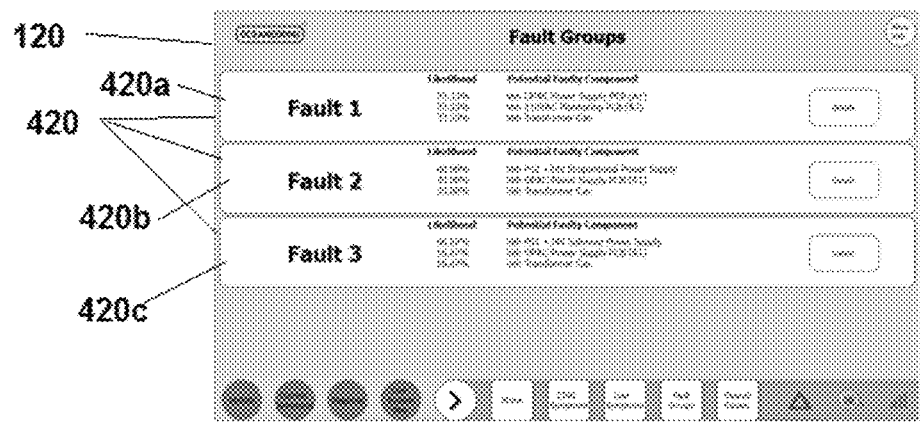
Figure 9:
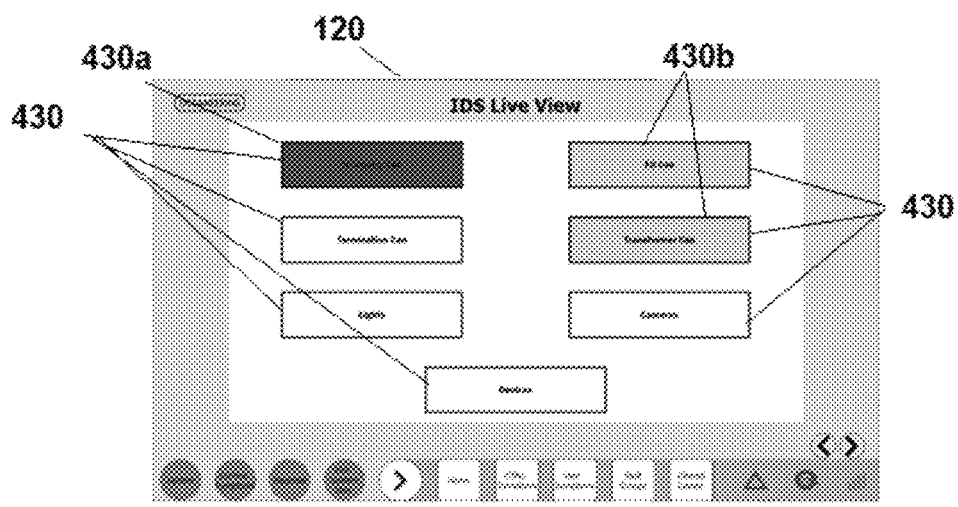

The locked mode (or latched mode) is a mode that occurs when diagnostic system 1 is connected to a monitored system 100 but where diagnostic system 1 is under a user's control. Locked mode is typically preferable when trying to fix a fault in monitored system 100. This mode only updates or syncs data from monitored system 100 when the user desires. Additionally, diagnoses are executed only when the user chooses to run them. When the diagnosis is run, the user is directed to a results screen. In an embodiment, screen displays comprise text rather than graphics. A results screen may show the number of distinct faults along with recommendations as to in which component 103,104 (FIG. 2) contain the fault (FIG. 8). A detailed view of a fault grouping may be selected, in which a list of causes which may be the root cause are listed as well as which symptoms are grouped together to yield this fault. A user can mark a possible cause as exonerated from this point in which case further diagnoses will remove the exonerated cause from this list (and may change the number of faults).

Once a set of recommended actions from a set of action data comprising data which can be taken with respect to the monitored device are selected based on the set of results of the diagnosis, a set of command actions may be recommended to address the set of results of the diagnosis where the set of command actions selected from the set of recommended actions. A command action directive may then be created for the monitored device selected from the recommended set of command actions. Typically, the recommend actions may include doing nothing in response to the changed system state. If the created command action is to do something, the intelligent diagnostic system software determines if the created command action requires human intervention and, if it does, can present the created command action on an output device such as a display for human intervention. If the created command action does not require human intervention, the intelligent diagnostic system software can send a one or more control commands to an appropriate circuit controller 155 such as via command module 45 to effect the created command action.

In any of these methods, logger 70 (FIG. 2) may be used to manage a set of log files 72 (FIG. 2). In these embodiments, logger 70, which is as described above, collates the set of log files to one or more tables of a database; extracts data from the collated set of log files into a log file data set; and applies a learning algorithm to the extracted data to generate a set of adjusted set of weights. This may also be used to change the list of possible symptom causes and associated set of weights to suspect if the symptom is occurring based on the set of adjusted set of weights.

Additionally, in any of these methods a system health status may be analyzed based on and using pre-computed values that generate a risk measure. A set of system implicated components is then determined, based on the analysis and an indication of the analyzed system health status provided via data output device 120.

Figure 6:
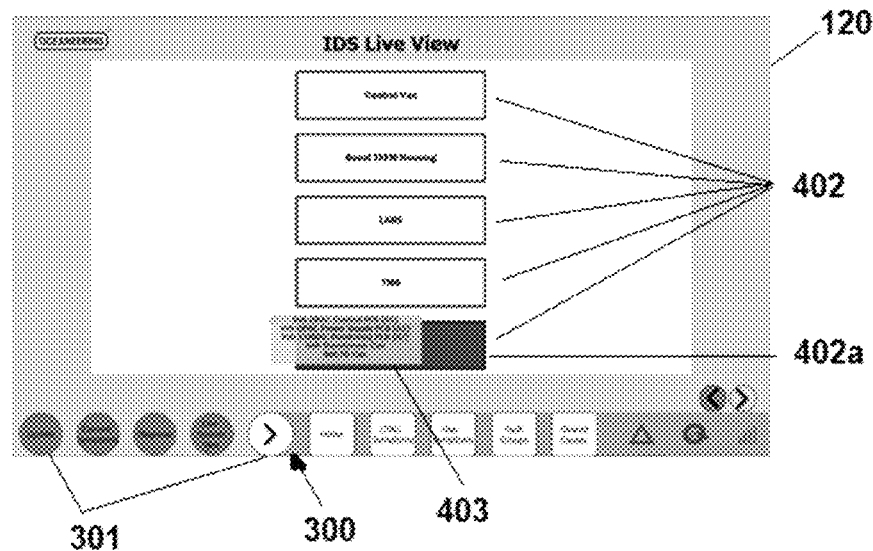
Figure 7:
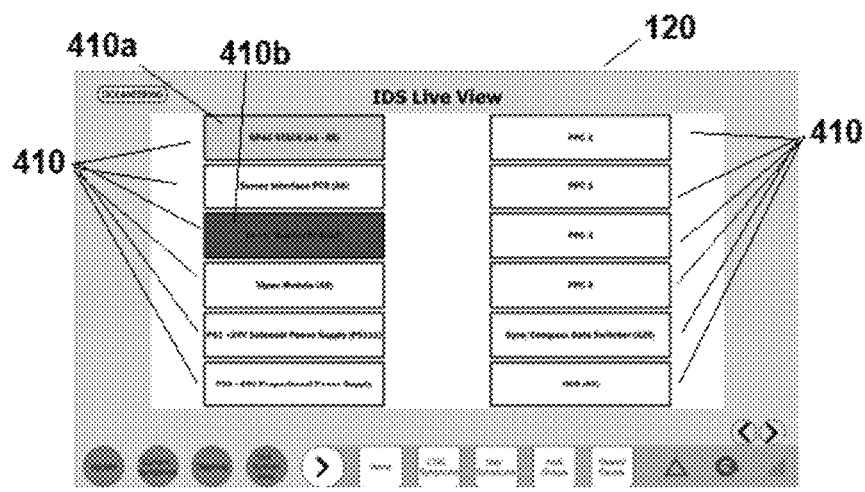

In any of these methods, a fault, e.g. 401 (FIG. 5), selected from a fault group (e.g., as shown at 450 in FIG. 11) may be presented to a user, e.g. at display device 120 (FIG. 5). As noted above, in a live mode a more probabilistic component (e.g. 402*a*, in FIG. 6) may be presented along with other possible components 402 (FIG. 6). A user may then "drill down" to see a set of graphic representations of components 410 (FIG. 6), some of which may be indicated as being more probable (410*a* (FIG. 6)) and others as most probable (410*b* (FIG. 6)). After the creation of fault groups as discussed above, fault groups 420 (FIG. 8) may be presented to a user along with weighted likelihoods and potentially faulty components. A further drill down can indicate a further set of graphic representations of components 430 (FIG. 9), some of which may be indicated as being more probable (430*a* (FIG. 9)) and others as most probable (430*b* (FIG. 9)).

Figure 10:
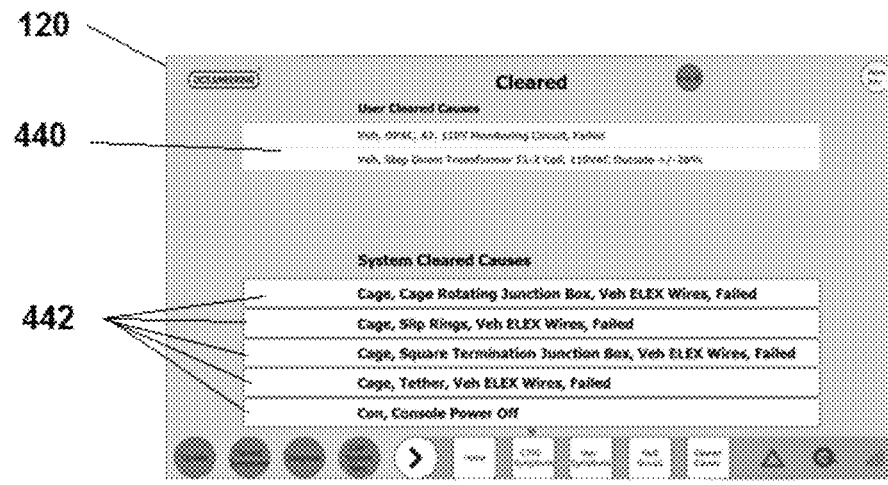
Figure 11:
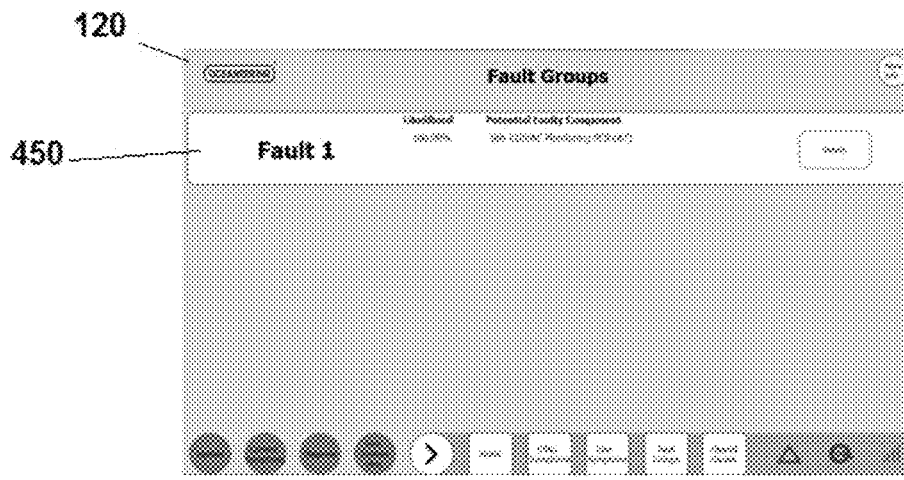

Referring additionally to FIG. 10, according to the methods discussed above a set of exonerated causes can be displayed, including those exonerated manually by a user 440 and those exonerated by the method 442.

Referring to FIG. 12, in a further embodiment graphical interface 460 may be used and be adapted for touch screens. Additionally, one or more status indications, e.g. 462, may be used to illustrate or otherwise provide feedback regarding a selected status.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A system for diagnosing a fault in real time, comprising:
   a) a monitored device, comprising:
      i) a circuit to be monitored;
      ii) a circuit controller operatively in communication with the circuit to be monitored;
      iii) a sensor operatively in communication with the circuit to be monitored, the sensor configured to provide condition state data representative of a predetermined set of condition states of the circuit to be monitored; and
      iv) a first data communication interface operatively in communication with the circuit controller and the sensor;
   b) a computer, comprising:
      i) a processor;
      ii) memory; and
      iii) a data store;
   c) a data receiver operatively in communication with the computer and the first data communication interface, the data receiver adapted to receive data related to the circuit to be monitored from the sensor of the monitored device, the received data comprising condition state data representative of a predetermined set of condition states of the circuit to be monitored;

d) intelligent diagnostic software resident in and configured to execute in the computer, the intelligent diagnostic software comprising:
  i) a software object defining a set of behavior-based diagnostic rules based on rules resident in the data store, the software object comprising a set of possible cause implications and exonerations of condition state data present in the predetermined set of condition states and further comprising:
    (1) a component data descriptor;
    (2) a decision path handler comprising a decision logic function description of pass/fail logic;
    (3) a set of condition cause data describing a set of possible causes which are relatable to a condition state present in the received data, the condition cause data comprising a set of component data descriptors;
    (4) a set of symptom-causality chain data descriptors;
    (5) a set of graphic representation objects;
    (6) a set of implication cause data comprising data related to a first component of the monitored device related to a cause of the condition state in the received data;
    (7) a set of exonerated cause data comprising data related to a second component of the monitored device which are exonerated when the condition state is not present in the received data; and
    (8) a set of action data comprising data which can be taken with respect to the monitored device;
    (9) a dynamic grouping algorithm operative to group a subset of data from the set of behavior-based diagnostic rules resident in the data store;
    (10) a set of information handlers;
  ii) an algorithm manager comprising a set of operative algorithms adapted to interface with the software object, the operative algorithms comprising a set of live algorithms and a set of user-initiated algorithms, the algorithm manager operatively in communication with the set of information handlers and configured and operative to prepare a member of the set of information handlers, provide data to the set of operative algorithms, and execute a member of the set of algorithms at a predetermined time;
  iii) a command manager operative to issue a control command to the circuit controller via the data receiver; and
  iv) a graphics interface handler; and
e) a data output device operatively in communication with the graphics interface handler.

2. The system for diagnosing a fault in real time of claim 1, wherein the command manager is configured to issue a control command to the circuit controller selected from the set of action data based on the set of implication cause data.

3. The system for diagnosing a fault in real time of claim 1, where the circuit to be monitored comprises an electrical circuit or a hydraulic circuit.

4. The system for diagnosing a fault in real time of claim 1, further comprising a network data interface operatively in communication with the data receiver and the computer, the network interface configured to use at least one of a TCP/IP network data protocol, a direct Ethernet connection, or a satellite modem.

5. The system for diagnosing a fault in real time of claim 4, wherein the system for diagnosing a fault is configured to be deployed as an on-site diagnostics tool for a single system to be monitored, an on-site diagnostics tool for a plurality of systems to be monitored, a remote diagnostics tool for a single system to be monitored, a remote diagnostics tool for a plurality of systems to be monitored, or as a monitoring system that monitors health and operation of a set of systems to be monitored from a single location.

6. The system for diagnosing a fault in real time of claim 1, wherein the data receiver comprises a serial data receiver operatively in communication with the system to be monitored or a manually input data receiver.

7. The system for diagnosing a fault in real time of claim 1, wherein:
  a) the data receiver comprises a data loader operatively in communication with the data store;
  b) the set of information handlers is operatively in communication with the data loader; and
  c) the graphics interface is operatively in communication with the set of information handlers and the algorithm manager.

8. The system for fault diagnosis in real time of claim 7, wherein:
  a) the set of behavior-based diagnostic rules are encrypted; and
  b) the data loader is further configured to read in the encrypted set of behavior-based diagnostic rules, decrypt the encrypted set of behavior-based diagnostic rules, parse the decrypted set of behavior-based diagnostic rules, and provide the parsed set of behavior-based diagnostic rules to the information handlers.

9. The system for diagnosing a fault in real time of claim 1, wherein the set of information handlers comprise:
  a) a fault symptom information handler;
  b) a fault causes information handler;
  c) a components information handler; and
  d) a graphics representation information handler.

10. The system for diagnosing a fault in real time of claim 1, further comprising a logger configured to accept messages to be logged from the intelligent diagnostic software, process the messages into a set of log files, manage the set of log files, and interface with the intelligent diagnostic software.

11. The system for diagnosing a fault in real time of claim 1, wherein:
  a) the set of component data descriptors comprises dynamically updatable data descriptors tailored to the monitored device;
  b) each member of the set of symptom-causality chain data descriptors comprises:
    i) a symptom name of a symptom;
    ii) a set of possible causes of the symptom and an associated set of probabilistic weights associated with the list of possible causes if the condition state in the received data comprises the symptom; and
    iii) a list of causes to exonerate if the condition state in the received data does not comprise the symptom; and
  c) the graphic representation objects comprise a name of an instance, an associated graphic, and a set of children graphic representation objects and components.

12. The system for diagnosing a fault in real time of claim 11, wherein the set of possible causes of the symptom and the associated set of probabilistic weights further comprise:
  a) a pointer to a unique component with which a specific cause of the symptom is associated;
  b) a set of possible symptoms to which the specific cause belongs; and c) a set of occurring symptoms to which the specific cause belongs.

13. The system for diagnosing a fault in real time of claim 11, wherein the set of symptom-causality chain data descriptors further comprises a set of client symptoms, the set of client symptoms comprising:
   a) a set of decision path handlers, which, when evaluated to true, indicate the symptom is occurring, and, when evaluated to false, indicate that the symptom is not occurring; and
   b) a staleness indicator to indicate whether or not the data used by the client symptom is stale, the staleness indicator comprising a set of staleness decision path handlers.

14. The system for diagnosing a fault in real time of claim 13, wherein each member of the set of symptom-causality chain data descriptors further comprises a first set of logic, configured to determine if the symptom is occurring, and a second set of logic, configured to determine whether or not the received data are stale, to be used with non-manually received data.

15. The system for diagnosing a fault in real time of claim 13, wherein the set of component data descriptors further comprise component data representing a physical component in the system to be monitored, the component data comprising:
   a) a set of links to causes representing possible physical failures within the physical component;
   b) a severity value representative of a likelihood of failure; and
   c) an alert value to represent that at least one set of links to causes representing possible physical failures within the physical component is suspect.

16. The system for diagnosing a fault in real time of claim 1, wherein the intelligent diagnostic system software further comprises a system health status analyzer, system health status analyzer comprising:
   a) logic to analyze system implicated components of the monitored device based on a set of predetermined values that represent a risk measure; and
   b) logic to provide an indication of the analyzed system health status on the data output device.

17. A method of diagnosing a fault in a system in real time, the system comprising a monitored device comprising a circuit to be monitored, a circuit controller operatively in communication with the circuit to be monitored, a sensor operatively in communication with the circuit to be monitored where the sensor is configured to provide condition state data representative of a predetermined set of condition states of the circuit to be monitored and a first data communication interface operatively in communication with the circuit controller and the sensor; a computer comprising a processor, memory, and a data store; a data receiver operatively in communication with the computer and the first data communication interface where the data receiver is adapted to receive data related to the circuit to be monitored from the sensor of the monitored device, the received data comprising condition state data representative of a predetermined set of condition states of the circuit to be monitored; intelligent diagnostic software resident in and configured to execute in the computer, the intelligent diagnostic software comprising a software object defining a set of behavior-based diagnostic rules based on rules resident in the data store, the software object comprising a set of possible cause implications and exonerations of condition state data present in the predetermined set of condition states and further comprising a reference descriptor, a decision path handler comprising a decision logic function description of pass/fail logic, a set of condition cause data describing a set of possible causes which are relatable to a condition state that in the received data, the condition cause data comprising a set of component data descriptors, a set of symptom-causality chain data descriptors, a set of graphic representation objects, a set of implication cause data comprising data related to a first component of the monitored device and related to a cause of the condition state in the received data, a set of exonerated cause data comprising data related to a second component of the monitored device which are exonerated when the condition state is not present in the received data, and a set of action data comprising data which can be taken with respect to the monitored device; a dynamic grouping algorithm operative to group a subset of data from the set of behavior-based diagnostic rules resident in the data store; a set of information handlers; an algorithm manager comprising a set of operative algorithms adapted to interface with the software object, the operative algorithms comprising a set of live algorithms and a set of user-initiated algorithms, the algorithm manager operatively in communication with the set of information handlers and configured and operative to prepare a member of the set of information handlers, provide data to the set of operative algorithms, and execute a member of the set of algorithms at a predetermined time; a command manager operative to issue a control command to the circuit controller via the data receiver; and a graphics interface handler; and a data output device operatively in communication with the graphics interface handler, the method comprising:
   a) obtaining a set of system condition state data in real time from the monitored device;
   b) using the intelligent diagnostic system software to activate the dynamic grouping algorithm when a system state of the system to be monitored changes from a first system state to a second system state, the changed system state being a member of the system condition state data;
   c) using the intelligent diagnostic system software to determine a possible cause of the changed system state;
   d) using the dynamic grouping algorithm to group a subset of pre-defined behavior-based rules data that share the possible cause into a set of distinct groups, each distinct group representing a distinct possible fault;
   e) using the intelligent diagnostic system software to create an exonerated set of causes from a subset of participating system states that are not present in the received system state data;
   f) providing the received system state data and their associated, non-exonerated causes to a grouping algorithm that uses a custom pseudo-measure to compare possible symptoms of the received system state data pair-wise with the set of behavior-based diagnostic rules and to establish a relative size of shared causes;
   g) using the intelligent diagnostic system software to fold the group of paired possible symptoms into a shared symptom group if the size of shared causes crosses a predetermined threshold;
   h) using the intelligent diagnostic system software to create a distinct symptom group if the size of shared causes does not cross a predetermined threshold;
   i) creating a set of results of the diagnosis;
   j) using the intelligent diagnostic system software to select a set of recommended actions from a set of action data comprising data which can be taken with respect to the monitored device based on the set of results of the diagnosis, the recommend actions including doing nothing in response to the changed system state;

k) recommending a set of command actions to address the set of results of the diagnosis, the set of command actions selected from the set of recommended actions; and l) creating a command action directive for the monitored device selected from the recommended set of command actions.

18. The method of claim 17, further comprising:
a) determining if the created command action is to do nothing or to do something; and
b) if the created command action is to do something:
 i) determining if the created command action requires human intervention;
 ii) presenting the created command action on an output device for human intervention if the created command action requires human intervention; and
 iii) sending a control command to the circuit controller from the command module to effect the created command action if the created command action does not require human intervention.

19. The method of claim 17, wherein the dynamic grouping algorithm further comprises a set of metrics which are improved programmatically using operational statistics information gathered from across a set of bio-electrical-mechanical systems.

20. The method of claim 17, further comprising using the algorithm manager to:
a) use and manage the set of live algorithms and the set of user-initiated algorithms;
b) prepare the fault symptom information handler whenever it is time to diagnose the system; and
c) run a selected subset of appropriate diagnostic algorithms.

21. The method of claim 17, further comprising configure the intelligent diagnostic software to cause a fault analysis to occur in response to an external event trigger.

22. The method of claim 17, wherein the intelligent diagnostic system software further comprises a system health status analyzer, the method further comprising using the system health status analyzer to:
a) analyze system implicated components of the monitored device based on a set of predetermined values that represent a risk measure; and
b) provide an indication of the analyzed system health status on the data output device.

23. A method of system fault diagnosis, comprising:
a) providing a set of objects in real time, the objects comprising encrypted data rules, to a computer comprising a processor, memory, and a data store, the set of encrypted data rules describing a system to be diagnosed by defining a set of possible cause implications and exonerations using an object comprising a reference descriptor, a decision path handler comprising a decision logic function description of pass/fail logic, a set of condition cause data describing a set of possible causes which are relatable to a condition state that may present in received data related to the system to be diagnosed where the condition cause data comprises a set of component data descriptors, a set of symptom-causality chain data descriptors, a set of graphic representation objects, a set of implication cause data comprising data related to a first component of the system to be monitored and related to a cause of the condition state in the received data; and a set of exonerated cause data comprising data related to a second component of the system to be monitored which are exonerated when the condition state is not present in the received data;
b) obtaining system state data related to the system to be diagnosed by the computer;
c) feeding the set of encrypted data rules into a data loader component of modular, extensible diagnostic software operatively resident in the computer, the modular, extensible diagnostic software comprising a set of information handlers operatively in communication with the data loader;
d) using the data loader to decrypt the set of encrypted data rules into an unencrypted set of data rules, parse the unencrypted set of data rules into an information class comprising an object of the set of objects and sort the parsed information class into a set of sorted data rules;
e) providing the sorted data rules to the set of information handlers;
f) obtaining system state data from the system to be diagnosed in real time;
g) using an algorithm manager of the modular, extensible diagnostic software to prepare the sorted data when it is time to diagnose the system;
h) using the provided object of the set of objects to create an inference of a set of causes of a system state change reflected in the received data as to the operation of various component within the system to be diagnosed, the creation comprising:
 i) associating a set of implicated causes that are implicated when a symptom is present in the obtained system state data, the set of implicated causes selected from the sorted data;
 ii) associating a set of exonerated causes that are exonerated when the symptom is not present in the obtained system state data, the set of exonerated causes selected from the sorted data;
 iii) activating a dynamic grouping algorithm when the obtained system state data reflects a system state change, the dynamic grouping algorithm configured to dynamically group a set of symptoms that share a common cause, where each distinct group represents a distinct fault, the dynamic grouping comprising using the dynamic grouping algorithm to isolate a set of possible faulty components and suggest a root cause by:
  (1) entering a set of symptoms present in the obtained system state data and a set of associated, non-exonerated causes into the dynamic grouping algorithm;
  (2) using a custom pseudo-measure to compare the entered set of symptoms pairwise and establish the relative size of shared causes;
  (3) dynamically creating a second set of groups by the dynamic grouping algorithm to yield the number of distinct faults in the system, comprising:
   (a) folding symptoms into a first shared causes group if a shared causes size crosses a predetermined threshold; and
   (b) separating symptoms into a second shared causes group if the shared causes size does not cross the predetermined threshold; and
   (c) displaying a set of results of the diagnosis via a graphics interface.

* * * * *